(12) United States Patent
Saha

(10) Patent No.: US 12,224,666 B2
(45) Date of Patent: Feb. 11, 2025

(54) DC-DC CONVERTER CONTROL CIRCUIT

(71) Applicant: GLOBALFOUNDRIES U.S. Inc., Malta, NY (US)

(72) Inventor: Shatabda Saha, Saxony (DE)

(73) Assignee: GLOBALFOUNDRIES U.S. Inc., Malta, NY (US)

( * ) Notice: Subject to any disclaimer, the term of this patent is extended or adjusted under 35 U.S.C. 154(b) by 236 days.

(21) Appl. No.: 17/748,772

(22) Filed: May 19, 2022

(65) Prior Publication Data

US 2023/0378871 A1 Nov. 23, 2023

(51) Int. Cl.
*H02M 3/158* (2006.01)
*H02M 1/00* (2006.01)
*H02M 1/08* (2006.01)
*H02M 1/14* (2006.01)

(52) U.S. Cl.
CPC ......... *H02M 3/158* (2013.01); *H02M 1/0009* (2021.05); *H02M 1/08* (2013.01); *H02M 1/14* (2013.01)

(58) Field of Classification Search
CPC .......... H02M 1/009; H02M 1/08; H02M 1/14; H02M 3/158; H02M 3/1584; H02M 3/1586; H02M 3/156; H02M 3/1563; H02M 3/1566; H02M 3/157; H02M 3/155

See application file for complete search history.

(56) References Cited

U.S. PATENT DOCUMENTS

| | | | |
|---|---|---|---|
| 6,519,167 B1 * | 2/2003 | Nguyen | ................ H03F 3/217 323/280 |
| 7,529,105 B1 * | 5/2009 | Choi | ................ H02M 3/33523 363/21.18 |
| 8,199,537 B2 | 6/2012 | Yan et al. | |
| 2005/0258814 A1 | 11/2005 | Chen et al. | |
| 2009/0040791 A1 * | 2/2009 | Qahouq | ................ H02M 3/1588 363/21.01 |
| 2014/0043002 A1 * | 2/2014 | Chung | ................ H02M 1/08 323/283 |

FOREIGN PATENT DOCUMENTS

EP      3109986 A1    12/2016

OTHER PUBLICATIONS

Michael D. Mulligan et al., "A 3MHz Low-Voltage Buck Converter with Improved Light Load Efficiency", https://ieeexplore.ieee.org/document/4242498, published in 2007 IEEE International Solid-State Circuits Conference. Digest of Technical Papers, Abstract, 2 pages.

Michael Hartshorne, "How to Improve Buck Converter Light Load Efficiency with an LDO", https://www.digikey.ch/de/articles/how-to-improve-buck-converter-light-load-efficiency-with-an-ldo, Digi-Key Electronics, May 31, 2016, 6 pages.

* cited by examiner

*Primary Examiner* — Nguyen Tran

(74) *Attorney, Agent, or Firm* — David Cain; Andrew M. Calderon; Calderon Safran & Wright P.C.

(57) ABSTRACT

The present disclosure relates to semiconductor structures and, more particularly, to a dc-dc converter control circuit and methods of manufacture. The structure includes a dynamic pulse width modulation (PWM) circuit which converts a sense voltage to a variable current in response to a load current being above a predetermined threshold, and a ramp generator circuit which receives the variable current from the dynamic PWM circuit and dynamically adjusts a fixed base frequency of a PWM signal to a dynamic frequency of the PWM signal which corresponds with the load current.

20 Claims, 5 Drawing Sheets

DC-DC CONVERTER CONTROL CIRCUIT

BACKGROUND

The present disclosure relates to semiconductor structures and, more particularly, to a dc-dc converter control circuit and methods of manufacture.

A known control method of a converter uses pulse width modulation (PWM) during a high load condition and pulse frequency modulation (PFM) during a low load condition. When the load current is reduced to a certain level, i.e., at light loads, PWM is turned off and PFM is turned on. Further, during the high load condition, an output voltage is controlled by PWM with independent control parameters.

SUMMARY

In an aspect of the disclosure, a structure comprises: a dynamic pulse width modulation (PWM) circuit which converts a sense voltage to a variable current in response to a load current being above a predetermined threshold; and a ramp generator circuit which receives the variable current from the dynamic PWM circuit and dynamically adjusts a fixed base frequency of a PWM signal to a dynamic frequency of the PWM signal which corresponds with the load current.

In an aspect of the disclosure, a structure comprises: a dynamic pulse width modulation (PWM) frequency control circuit which comprises a voltage-current converter which receives a load sensing voltage and converts the load sensing voltage to a variable current, and a load current sense circuit which receives the a sense voltage and outputs the load sensing voltage; and a ramp generator circuit which receives the variable current from the dynamic PWM frequency control circuit and outputs a fixed base frequency in response to a load current being below a predetermined threshold and dynamically adjusts the fixed base frequency of a PWM signal to a dynamic frequency of the PWM signal which corresponds with the load current in response to the load current being above the predetermined threshold.

In an aspect of the disclosure, a method comprises: determining that a load current is above a predetermined threshold; receiving a sense voltage and converting the sense voltage to a variable current in response to the load current being above the predetermined threshold; and dynamically adjusting a based fixed frequency of a PWM signal to a dynamic frequency of the PWM signal based on the variable current corresponding to the load current.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1:
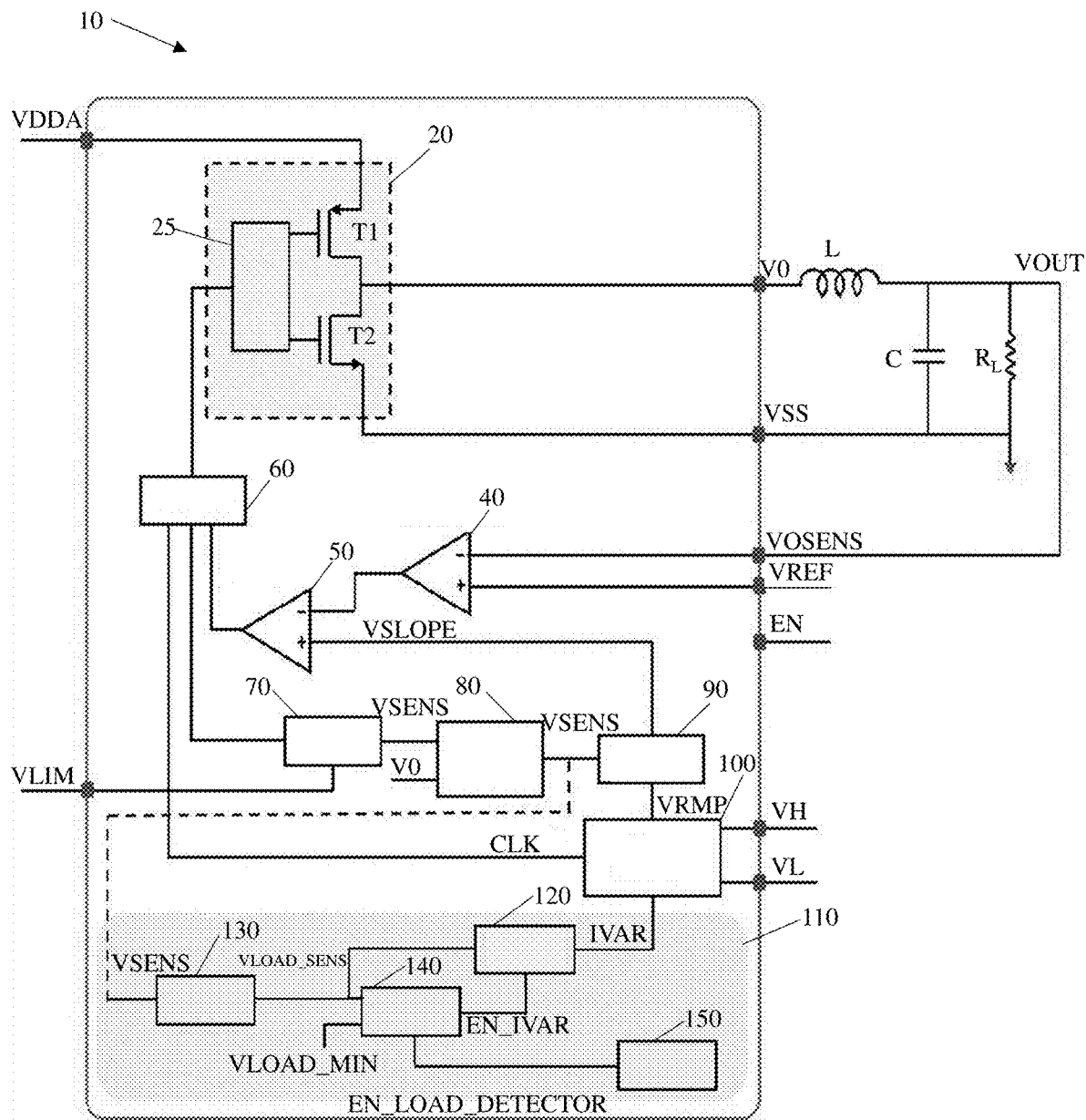
FIG. 1 shows a current mode dc-dc buck converter circuit with dynamic pulse width modulation (PWM) control in accordance with aspects of the present disclosure.

The present disclosure relates to semiconductor structures and, more particularly, to a dc-dc converter control circuit and methods of manufacture. In embodiments, the present disclosure has a single pulse width modulation (PWM) control for all load currents, utilizes a fixed base frequency to define a fixed output voltage ripple across all low load conditions, dynamically tracks load conditions and adjusts frequency to deliver efficiency, and operates within a predetermined frequency boundary and a predetermined maximum load condition. Advantageously, by using the based fixed frequency across all low load conditions and dynamically tracking load condition and adjusting frequency, improved and optimized efficiency is delivered at both the low load condition and high load condition. Further, as the PWM mode operates within the predetermined frequency boundary, the circuit of the present disclosure provides a better regulated operation. Also, as the implementation of the present disclosure only uses the PWM mode, the output voltage ripple performance is improved, the minimum frequency is fixed, and the maximum load condition and maximum frequency is within a defined range.

In contrast to known circuits, the present disclosure improves the efficiency for low load and high load conditions by tracking the load current and adjusting a switching frequency. In embodiments, a circuit starts at a minimum fixed base frequency, tracks a load current, and converts the load current to a sense voltage. In embodiments, the sense voltage is used to create a current (i.e., variable current) that is proportional to the sense voltage. Therefore, a current (i.e., variable current) dynamically tracks the load current. And when the load current exceeds a certain threshold, a pulse width modulation (PWM) signal is created with a frequency proportional to the load current.

In additional embodiments, the circuit operates in a single control mode of a pulse width modulation (PWM). The single control mode starts with a minimum fixed base frequency and operates at the minimum fixed base frequency for low load conditions. As a load current exceeds a predetermined threshold, the circuit adapts with a change in a load current by dynamically increasing an operating frequency to deliver a better efficiency across all load conditions.

In more specific embodiments, a circuit includes: a dynamic pulse width modulation (PWM) circuit which receives a sense voltage and converts the sense voltage to a variable current in response to a load current being above a predetermined threshold; and a ramp generator circuit which receives the variable current from the dynamic PWM circuit and dynamically adjusts a fixed base frequency of a PWM signal to a dynamic frequency of the PWM signal which corresponds with the load current. In further embodiments, a method includes determining that a load current is above a predetermined threshold; receiving a sense voltage and converting the sense voltage to a variable current in response to the load current being above the predetermined threshold; and dynamically adjusting a based fixed frequency of a PWM signal to a dynamic frequency of the PWM signal based on the variable current corresponding to the load current.

The dc-dc converter control circuit of the present disclosure may be manufactured in a number of ways using a number of different tools. In general, though, the methodologies and tools are used to form structures with dimensions in the micrometer and nanometer scale. The methodologies, i.e., technologies, employed to manufacture the dc-dc converter control circuit of the present disclosure have been adopted from integrated circuit (IC) technology. For example, the structures are built on wafers and are realized in films of material patterned by photolithographic processes on the top of a wafer. In particular, the fabrication of the structure uses three basic building blocks: (i) deposition of thin films of material on a substrate, (ii) applying a patterned mask on top of the films by photolithographic imaging, and (iii) etching the films selectively to the mask.

FIG. 1 shows a current mode dc-dc buck converter circuit with dynamic pulse width modulation (PWM) control in accordance with aspects of the present disclosure. In embodiments, a circuit structure 10 of FIG. 1 includes a power field effect transistor (FET) structure block 20, an error amplifier 40, a comparator 50, a pre-driver 60, a current limiter 70, a current sense structure 80, a summing circuit 90, a ramp generator 100, a dynamic PWM control structure block 110, an inductor L, a capacitor C, and a resistor $R_L$. In embodiments, the resistor $R_L$ can be replaced with a current load. Further, the power FET structure block 20 includes transistors T1, T2 (e.g., T1 and T2 are NMOS transistors or, alternatively, T1 is a PMOS transistor and T2 is a NMOS transistor) and a driver 25. In addition, the dynamic PWM control structure block 110 includes a voltage-current (V-I) converter 120, a load current sensor 130, a load detector 140, and a start-up detector 150.

In FIG. 1, an input voltage VDDA is connected to a terminal of transistor T1. For example, the terminal of the transistor T1 is a drain of the transistor T1 when the transistor T1 is a NMOS transistor. Alternatively, the terminal of the transistor T1 is a source of the transistor T1 when the transistor T1 is a PMOS transistor. Further, a source of the transistor T1 is connected to a drain of the transistor T2 when the transistor T1 is a NMOS transistor. Alternatively, the drain of the transistor T1 is connected to the drain of the transistor T2 when the transistor T1 is a PMOS transistor. A source of the transistor T2 is connected to a voltage supply VSS. Gates of the transistors T1, T2 are connected to the driver 25. The driver 25 is also connected to the pre-driver 60. The inductor L is connected between a voltage V0 and a voltage output VOUT. The capacitor C and the resistor $R_L$ (or a current load) are both connected between the voltage output VOUT and the voltage supply VSS.

In FIG. 1, the error amplifier 40 receives a feedback voltage VOSENS and a reference voltage VREF and outputs a voltage to the comparator 50. In embodiments, the output of the error amplifier 40 may be connected to a compensation network (not shown in FIG. 1). The comparator 50 also receives a voltage VSLOPE which is compared to the output of the error amplifier 40, and the output of the comparator 50 is sent to the pre-driver 60. The current limiter 70 receives a sensing voltage VSENS from the current sense structure 80 and a voltage limiter signal VLIM. The current limiter 70 outputs a signal to the pre-driver 60 based on a comparison of the sensing voltage VSENS and the voltage limiter signal VLIM. When the sensing voltage VSENS exceeds the voltage limiter signal VLIM, the pre-driver 60 receives a signal to turn off the transistor T1. In other words, the pre-driver 60 receiving the signal to turn off the transistor T1 provides an overcurrent protection. The current sense structure 80 receives the voltage V0 and outputs the sensing voltage VSENS to the summing circuit 90 and the current limiter 70. The summing circuit 90 receives the ramp voltage VRMP from the ramp generator 100 and sensing voltage VSENS from the current sense structure 80 for summing and outputs voltage VSLOPE to the comparator 50.

Still referring to FIG. 1, the ramp generator 100 receives a high threshold voltage VH, a low threshold voltage VL, a variable current IVAR from the dynamic PWM control structure block 110, and outputs the ramp voltage VRMP to the summing circuit 90 and a clock signal CLK to the pre-driver 60. The ramp voltage VRMP swings between the high threshold voltage VH and the low threshold voltage VL. In operation, the variable current IVAR is "0" when a load current is below a predetermined threshold (i.e., at a low load condition such that a base frequency is used and the base frequency of a PWM signal is not dynamically adjusted). Further, the variable current IVAR is above "0" when the load current is above the predetermined threshold (i.e., at a high load condition such that the base frequency of the PWM signal is dynamically adjusted in the ramp generator 100 to track the load current). In particular, in the high load condition, a value of the variable current IVAR is based on a difference of the load current and the predetermined threshold or can be a copy of the load current. The load detector 140 enables the V-I converter 120 when the predetermined threshold is exceeded.

In the dynamic PWM control structure block 110, the load current sensor 130 receives the sensing voltage VSENS from the current sense structure 80 and outputs a load sensing voltage VLOAD_SENS to the load detector 140. The load detector 140 receives the load sensing voltage VLOAD_SENS, an enable load detector signal EN_LOAD_DETECTOR from a start-up detector 150, and a voltage equivalent of a minimum load current VLOAD_MIN, and outputs the enable variable current signal EN_IVAR to the V-I converter 120. The voltage equivalent of the minimum load current VLOAD_MIN is a voltage at which the PWM frequency starts to change dynamically. The V-I converter 120 receives the enable variable current signal EN_IVAR and the load sensing voltage VLOAD_SENS and outputs the variable current IVAR to the ramp generator 100.

In operation of FIG. 1, the power field effect transistor (FET) structure block 20 receives the input voltage VDDA and outputs the voltage V0 through the inductor L to generate the output voltage VOUT. The output voltage VOUT has a voltage value lower than the input voltage VDDA. Further, the error amplifier 40, the comparator 50, and the pre-driver 60 provide a voltage feedback loop to the driver 25 of the power FET structure block 20 by comparing the reference voltage VREF with the feedback voltage VOSENS. The feedback voltage VOSENS can be the same as the output voltage VOUT or a scaled down version of the output voltage VOUT. In a current feedback loop, an inductor current of the inductor L is sensed by the current sense structure 80, converted to a corresponding sense voltage VSENS which is proportional to the current flowing through the inductor L and the corresponding sense voltage VSENS, and then provided to the summing circuit 90. The voltage loop and the current loop work together in setting the output voltage VOUT and controlling a loop response in response to a dynamic change in a load condition. A current limit function is controlled by the current limiter 70, the current sense structure 80, and the pre-driver 60. The current limit function works independent of a load condition.

In further operation of FIG. 1, the dynamic PWM control structure block 110 receives the sensing voltage VSENS from the current sense structure 80 and outputs the load sensing voltage VLOAD_SENS. The load sensing voltage VLOAD_SENS and the minimum voltage load signal VLOAD_MIN are used to output the enable variable current signal EN_IVAR to the V-I converter 120. The V-I converter 120 receives the enable variable current signal EN_IVAR and the load sensing voltage VLOAD_SENS and outputs the variable current IVAR to the ramp generator 100. In embodiments, by tracking the load current, generating and sending the variable current IVAR to the ramp generator 100, a base frequency in the ramp generator 100 is increased in proportion to the load current. By increasing the base frequency in proportion to the load current, the load current is dynamically tracked in the ramp generator 100 and a PWM frequency can be adjusted to optimize the efficiency of the circuit structure 10.

Figure 2:
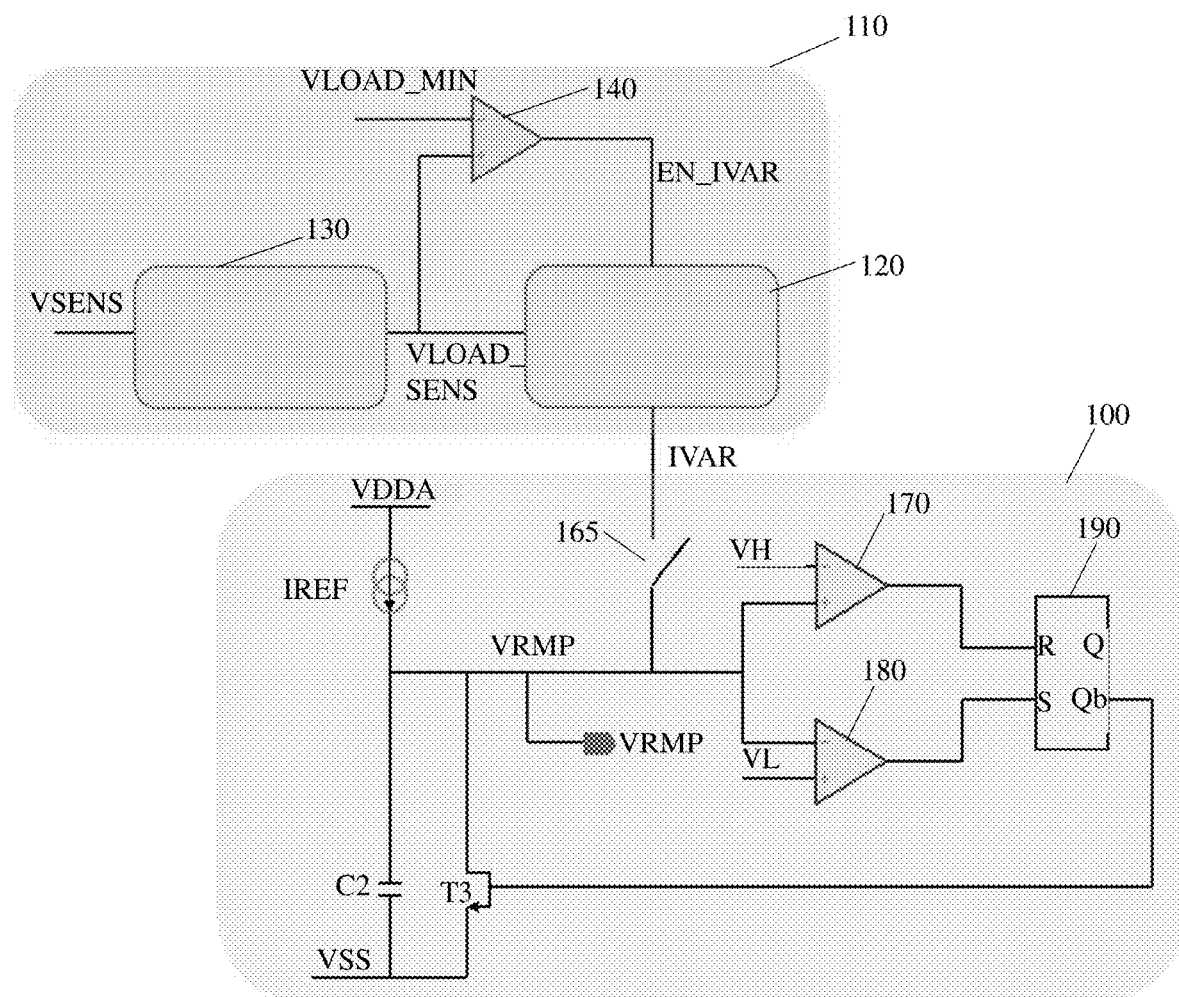
FIG. 2 shows the dynamic PWM control of FIG. 1 in accordance with aspects of the present disclosure.

FIG. 2 shows the detailed dynamic PWM control of FIG. 1 in accordance with aspects of the present disclosure. In FIG. 2, the dynamic PWM control structure block 110 includes the V-I converter 120, the load current sensor 130, and the load detector 140. In particular, the load detector 140 comprises a comparator. FIG. 2 also shows ramp generator 100 which includes a high voltage threshold comparator 170, a low voltage threshold comparator 180, a flip flop circuit 190, a capacitor C2, and a transistor T3 (e.g., an NMOS transistor).

In FIG. 2, a switch 165 is open when the load current is below the predetermined threshold (i.e., at a low load condition). Thus, when the switch 165 is open, the variable current IVAR is "0" and a base frequency is generated by the ramp generator 100 for the circuit structure 10 of FIG. 1 (i.e., no need for dynamically adjusting the base frequency of a PWM signal). On the other hand, when the switch 165 is closed, the variable current IVAR is above "0" and the value of the variable current IVAR is based on the load current. A higher load current provides a higher variable current IVAR, and a lower load current provides a lower variable current IVAR. Further, when the switch 165 is closed, the base frequency of the PWM signal is dynamically adjusted by the ramp generator 100 for the increase in load current.

In FIG. 2, a base reference current IREF may be a constant bias current that charges the capacitor C2. Regardless of whether the switch 165 is closed or open, the base reference current IREF may flow through the capacitor C2 in an operational mode. The high voltage threshold comparator 170 performs a comparison of the ramp voltage VRMP with the high voltage VH and outputs to a reset of the flip flop circuit 190. The low voltage threshold comparator 180 also receives the ramp voltage VRMP and performs a comparison with the low voltage VL and outputs to a set of the flip flop circuit 190.

In an operation of the ramp generator 100, when the ramp voltage VRMP is greater than the high voltage VH, the flip flop circuit 190 is reset and the transistor T3 is enabled. The ramp voltage VRMP is discharged towards the low threshold voltage VL and the flip flop circuit 190 is set when the ramp voltage VRMP falls below the low threshold voltage VL. In the ramp generator 100, the frequency of the ramp generator FRMP is defined and generated by the following equation:

$$FRMP=(IREF+IVAR)/(C2*(VH-VL)) \quad \text{(Equation 1)}$$

In the equation 1 above, IREF is the base reference current IVAR is the variable current, C2 is the capacitor between a node VRMP and the voltage supply VSS, VH is the high threshold voltage, and VL is the low threshold voltage for the ramp voltage VRMP. In equation 1, FRMP is at a minimum when IVAR=0 and FRMP is at a maximum when the load current (i.e., ILOAD) is at a maximum.

In FIG. 2, the load detector 140 comprising a comparator receives the minimum voltage load signal VLOAD_MIN and the load sensing voltage VLOAD_SENS and outputs the enable variable current signal EN_IVAR. As shown in FIG. 1, the load current sensor 130 receives the sensing voltage VSENS (from the current sense structure 80 as shown in FIG. 1), and outputs the load sensing voltage VLOAD_SENS to the V-I converter 120 and the load detector 140 comprising the comparator. The V-I converter 120 receives the load sensing voltage VLOAD_SENS and the enable variable current signal EN_IVAR and outputs the variable current IVAR to ramp generator 100.

In an operation of the dynamic PWM control structure block 110, when the load sensing voltage VLOAD_SENS (i.e., which corresponds to the load current) is above the voltage equivalent of a minimum load current VLOAD_MIN (i.e., which corresponds to the load current above which the dynamic PWM starts operating), the enable variable current signal EN_IVAR is enabled and the switch 165 is closed. As disclosed above, when the enable variable current signal EN_IVAR is enabled and the switch 165 is closed, the base frequency of the PWM signal is dynamically adjusted in the ramp generator 100 to correspond with the increase in the load current. Further, when the enable variable current signal EN_IVAR is not enabled and the switch 165 is open, the base frequency is generated by the ramp generator 100 for the circuit structure 10.

When the load current ILOAD is close to a threshold limit (or the load sensing voltage VLOAD_SENS is close to the voltage equivalent of a minimum load current VLOAD_MIN), there is a possibility that the load detector 140 comprising a comparator can switch between logic high and low. This situation would cause the enable variable current signal EN_IVAR to toggle between an enable and a disable. In order to avoid any false switching, hysteresis is added to the voltage equivalent of a minimum load current VLOAD_MIN. In particular, when the load sensing voltage VLOAD_SENS exceeds the voltage equivalent of a minimum load current VLOAD_MIN, the enable variable current signal EN_IVAR is enabled. At the same time, the voltage equivalent of a minimum load current VLOAD_MIN is reduced. Therefore, the load sensing voltage VLOAD_SENS has to fall below the new voltage equivalent of a minimum load current VLOAD_MIN until the enable variable current signal EN_IVAR is disabled. In this situation, any unnecessary oscillations are avoided that may arise when the load current ILOAD is near the threshold limit (or when the load sensing voltage VLOAD_SENS is close to the voltage equivalent of a minimum load current VLOAD_MIN).

Figure 3:
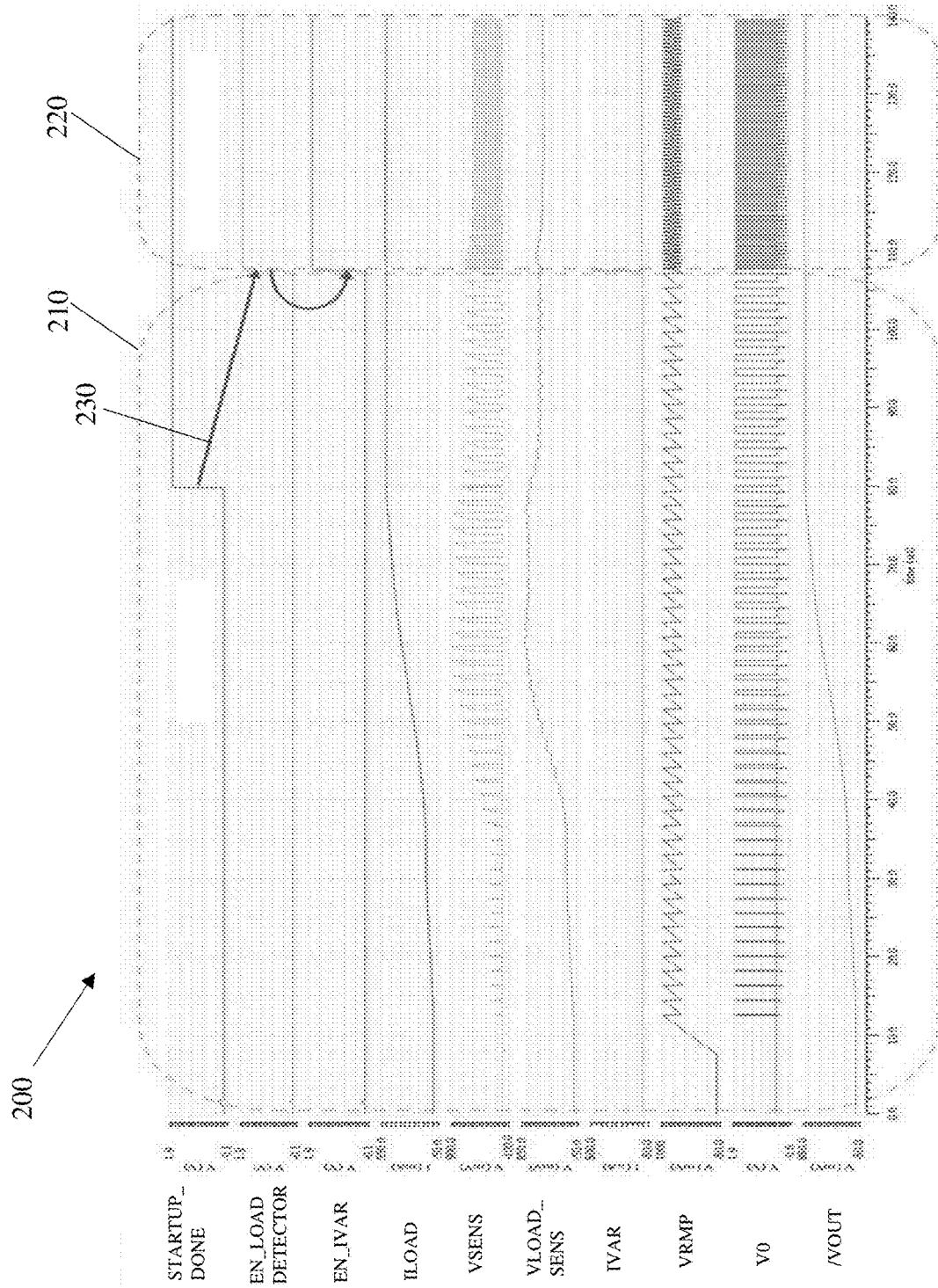
FIGS. 3-5 show graphs of the dynamic PWM control in accordance with aspects of the present disclosure.
Figure 4:
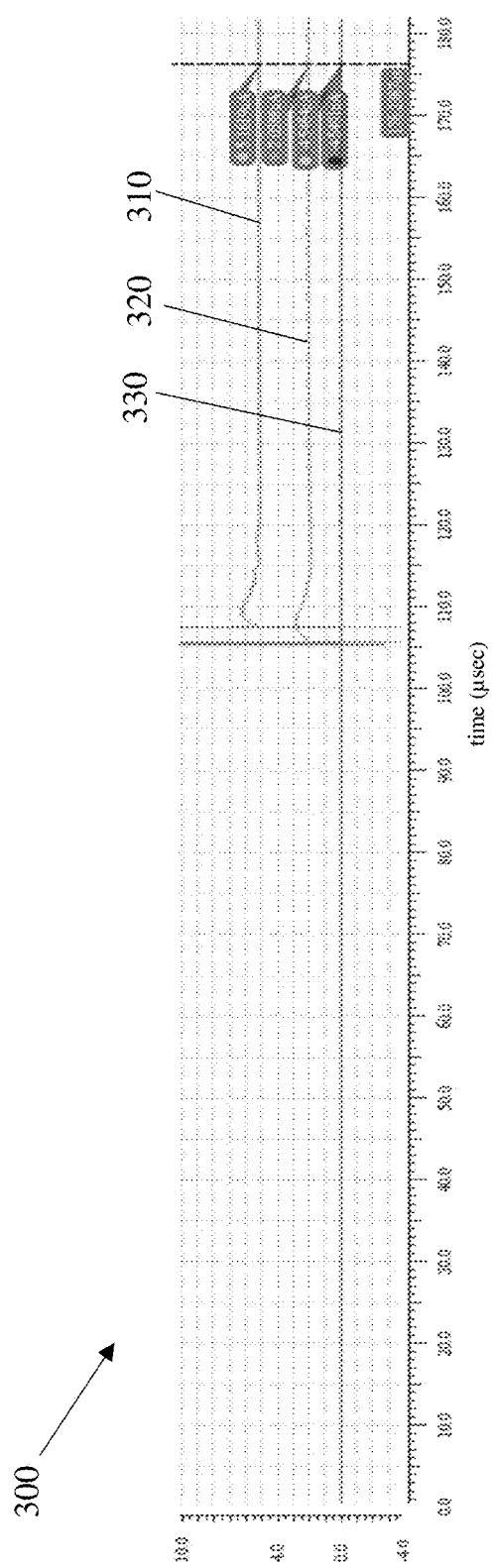
Figure 5:
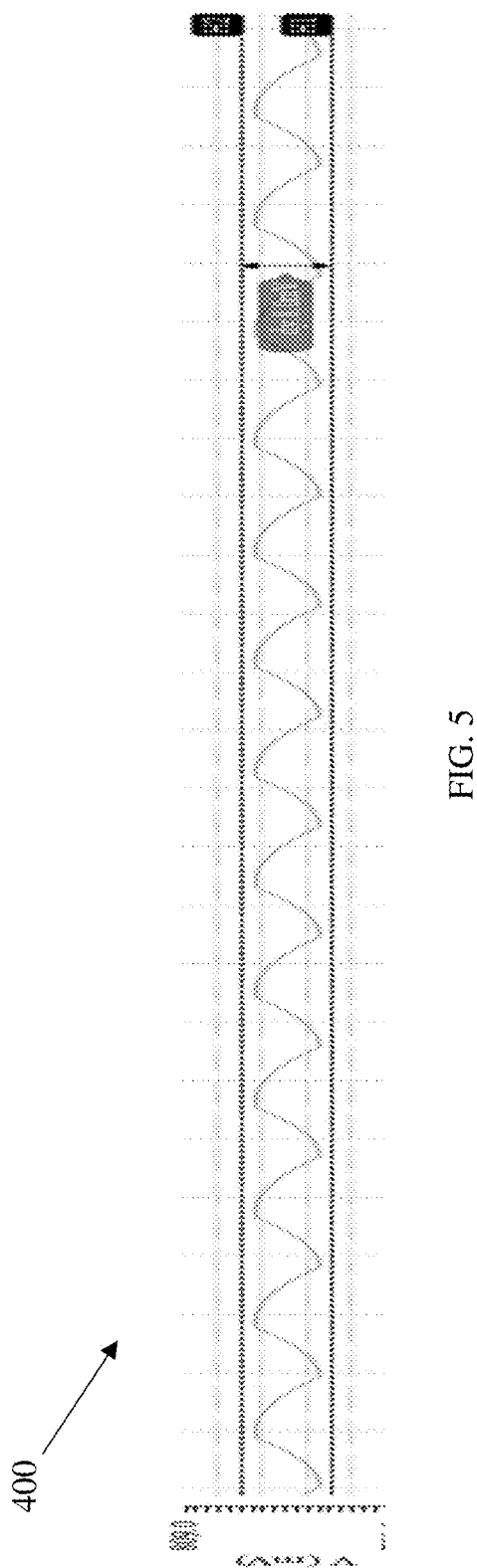

FIGS. 3-5 show graphs of the dynamic PWM control in accordance with aspects of the present disclosure. In FIG. 3, graph 200 of the dynamic PWM control includes a start-up phase 210 and a load tracking phase 220. In the start-up phase 210, a base frequency is used for the circuit structure 10 at low load conditions (i.e., when the enable variable current signal EN_IVAR is not enabled due to a low value of a load current ILOAD). After the start-up phase 210 is complete, STARTUP_DONE goes high. After the start-up phase 210 is complete, there may be a delay to allow the internal nodes to settle. After the delay is over (as shown by arrow 230), the signal EN_LOAD DETECTOR is enabled. At this point, the system exits the start-up phase 210 and enters the load tracking phase 220. At the start of the load tracking phase 220, the enable load detector signal EN_LOAD_DETECTOR is enabled. This enables the load detector 140 comprising a comparator such that the comparator compares the load sensing voltage VLOAD_SENS with the voltage equivalent of a minimum load current VLOAD_MIN. In FIG. 3, the load current ILOAD is higher than a threshold current and hence the enable variant current signal EN_IVAR goes high. During the load tracking phase 220, the base frequency of the PWM signal is dynamically adjusted to correspond with the increase in the load current ILOAD. For example, as shown in the graph 200, the ramp voltage VRMP has a much higher switching frequency in the load tracking phase 220 than the start-up phase 210.

FIG. 4 shows a graph 300 of the variable current IVAR for different load currents ILOAD. In FIG. 4, line 310 of the variable current IVAR corresponds with the load current ILOAD of approximately 500 mA. The line 310 has approximately 5 μA at approximately 176 μsec. Line 320 of the variable current IVAR corresponds with the load current ILOAD of approximately 200 mA. The line 320 has approximately 2 μA at approximately 176 μsec. Line 330 of the variable current IVAR corresponds with the load current ILOAD of approximately 50 mA at approximately 176 μsec. The line 330 has approximately zero current (e.g., −4.5 nA in a simulation at approximately 176 μsec, which is more associated with noise/leakage). Therefore, the graph 300 of FIG. 4 shows that the variable current IVAR tracks and corresponds with the load current ILOAD of the circuit structure 10.

FIG. 5 shows a graph 400 of the voltage output VOUT for a low value of the load current ILOAD (i.e., approximately 0 to load current ILOAD threshold). In particular, in known circuits, at a low load condition (i.e., the low current ILOAD of approximately 0 to load current ILOAD threshold), the output voltage has a ripple which is poor and unregulated. In contrast, as shown in the graph 400, the voltage output VOUT of the present disclosure has a regulated and bounded output voltage ripple of approximately 8 mV. In this example, the regulated and bounded output voltage ripple is constant (e.g., 8 mv) for a range of the load current ILOAD=0 to the load current ILOAD=threshold value. The regulated and bounded output voltage ripple can be dependent on design parameters and design requirements.

The dc-dc converter control circuit may be utilized in system on chip (SoC) technology. The SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also used in embedded systems and the Internet of Things.

The method(s) as described above is used in the fabrication of integrated circuit chips. The resulting integrated circuit chips may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either surface interconnections and buried interconnections or both surface interconnections and buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
   a dynamic pulse width modulation (PWM) circuit which converts a sense voltage to a variable current in response to a load current being above a predetermined threshold, wherein the dynamic PWM circuit comprises a comparator that is enabled using an enable signal and the comparator outputs an enable variable current signal, the enable variable current signal and the converted sense voltage being utilized by a voltage-current converter to output the variable current; and
   a ramp generator circuit which receives the variable current from the dynamic PWM circuit and dynamically adjusts a fixed base frequency of a PWM signal to a dynamic frequency of the PWM signal corresponding with the load current.

2. The structure of claim 1, wherein the dynamic PWM circuit comprises the voltage-current converter which converts a load sensing voltage to the variable current.

3. The structure of claim 2, wherein the comparator receives the load sensing voltage and a voltage equivalent of a minimum load current.

4. The structure of claim 3, wherein the comparator receives the enable signal for enabling the comparator.

5. The structure of claim 2, wherein the dynamic PWM circuit comprises a load current sense circuit which receives the sense voltage and outputs the load sensing voltage.

6. The structure of claim 1, wherein the ramp generator circuit comprises a flip flop circuit which is reset in response to a ramp voltage being greater than a high voltage signal.

7. The structure of claim 6, wherein the ramp generator circuit further comprises an NMOS transistor which is enabled in response to the flip flop circuit being reset.

8. The structure of claim 6, wherein the flip flop circuit is set in response to the ramp voltage falling below a low voltage signal.

9. The structure of claim 1, wherein the ramp generator circuit outputs the fixed base frequency in response to the load current being below the predetermined threshold.

10. The structure of claim 9, wherein the variable current is zero in response to the load current being below the predetermined threshold.

11. The structure of claim 9, wherein the fixed base frequency generates a fixed output voltage ripple in response to the load current being below the predetermined threshold.

12. A structure comprising:
    a dynamic pulse width modulation (PWM) frequency control circuit comprising a voltage-current converter which receives a load sensing voltage and converts the load sensing voltage to a variable current, and a load current sense circuit which receives a sense voltage and outputs the load sensing voltage, the dynamic PWM frequency control circuit further comprising a comparator that is enabled using an enable signal and outputs an enable variable current signal to the voltage-current converter; and
    a ramp generator circuit which receives the variable current from the dynamic PWM frequency control circuit and outputs a fixed base frequency in response to a load current being below a predetermined threshold, and dynamically adjusts the fixed base frequency of a PWM signal to a dynamic frequency of the PWM signal corresponding with the load current being above the predetermined threshold.

13. The structure of claim 12, wherein the comparator receives the load sensing voltage and a voltage equivalent of a minimum load current.

14. The structure of claim 13, wherein the comparator also receives the enable signal from a start-up detector for enabling the comparator.

15. The structure of claim 12, wherein the ramp generator circuit comprises a flip flop circuit which is reset in response to a ramp voltage being greater than a high voltage signal.

16. The structure of claim 15, wherein the ramp generator circuit further comprises an NMOS transistor which is enabled in response to the flip flop circuit being reset.

17. The structure of claim 15, wherein the flip flop circuit is set in response to the ramp voltage falling below a low voltage signal.

18. The structure of claim 12, wherein the variable current is zero in response to the load current being below the predetermined threshold.

19. The structure of claim 12, wherein the fixed base frequency generates a fixed output voltage ripple in response to the load current being below the predetermined threshold.

20. A method comprising:
   receiving an enable signal;
   determining that a load current is above a predetermined threshold;
   receiving the enable variable current signal and a sense voltage and converting the sense voltage and the enable variable current signal to a variable current in response to the load current being above the predetermined threshold, the enable variable current signal and the converted sense voltage being utilized by a voltage-current converter to output the variable current; and
   dynamically adjusting a fixed base frequency of a PWM signal to a dynamic frequency of the PWM signal based on the variable current corresponding to the load current.

* * * * *